F. T. JOHNSON.
CLOTHES DRIER.
APPLICATION FILED APR. 20, 1907.
913,823.
Patented Mar. 2, 1909.
2 SHEETS—SHEET 1.
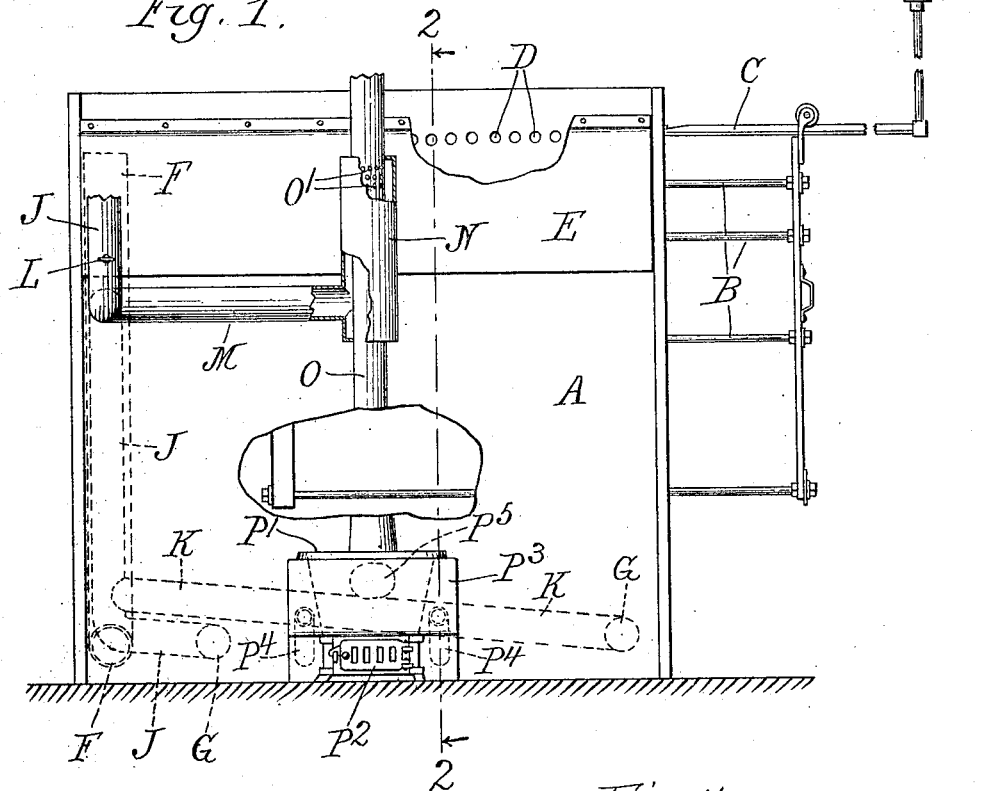
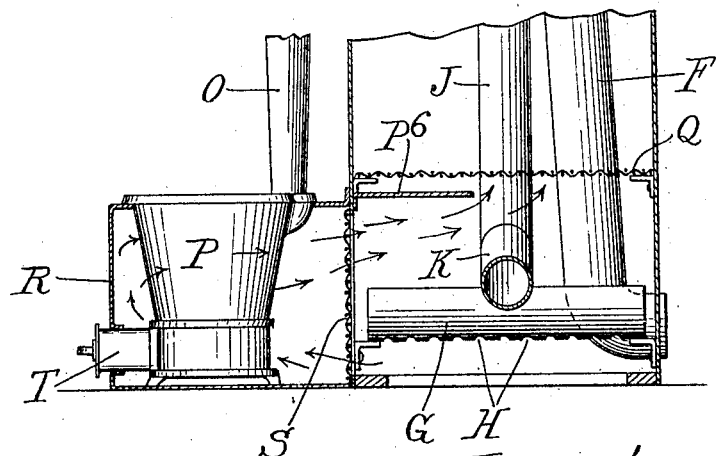
Witnesses,
Edward T. Wray
Lucy A. Falkenberg
Inventor.
Francis T. Johnson,
by Parker Carter
Attorneys.

F. T. JOHNSON.
CLOTHES DRIER.
APPLICATION FILED APR. 20, 1907.
913,823.
Patented Mar. 2, 1909.
2 SHEETS—SHEET 2.
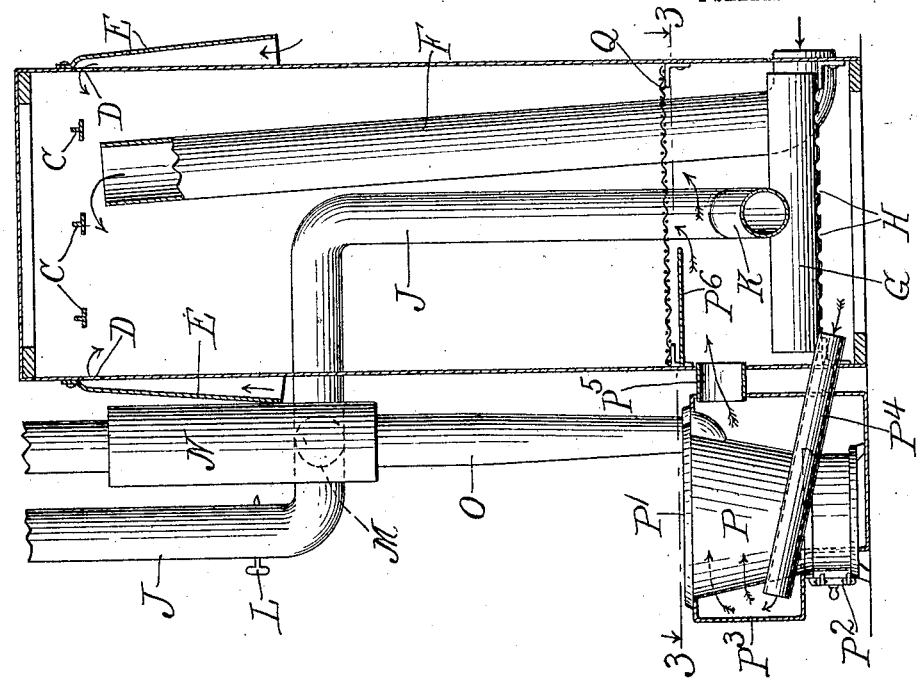
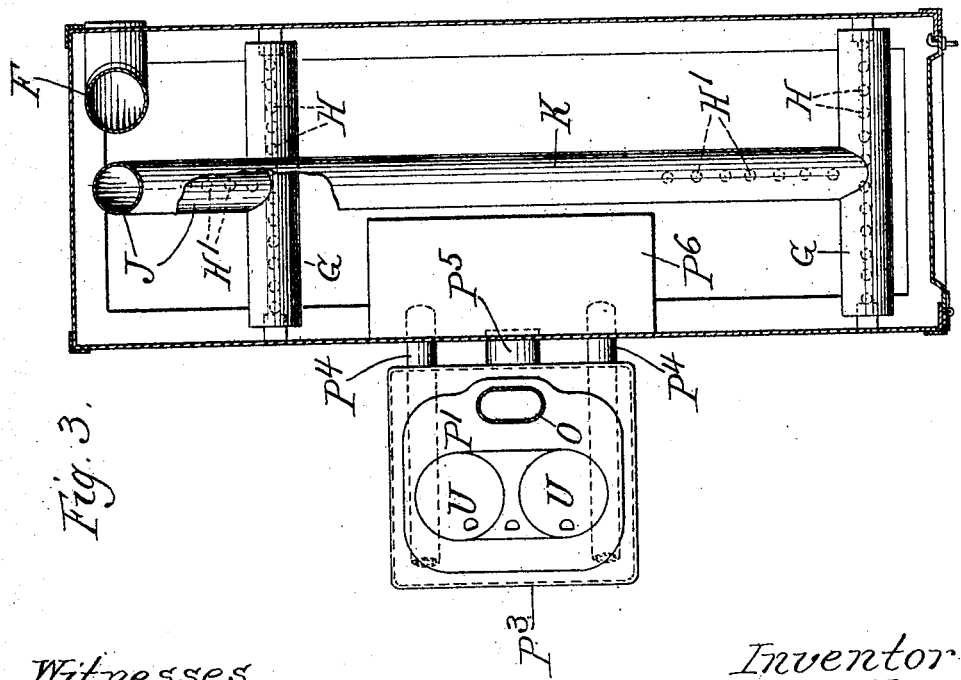
Witnesses.
Edward T. Wray.
Lucy A. Falkenburg.
Inventor.
Francis T. Johnson
by
Attorneys.

UNITED STATES PATENT OFFICE.

FRANCIS T. JOHNSON, OF CHICAGO, ILLINOIS.

CLOTHES-DRIER.

No. 913,823. Specification of Letters Patent. Patented March 2, 1909.

Application filed April 20, 1907. Serial No. 369,328.

*To all whom it may concern:*

Be it known that I, FRANCIS T. JOHNSON, a citizen of the United States, residing at Chicago, in the county of Cook and State of Illinois, have invented a certain new and useful Improvement in Clothes-Driers, of which the following is a specification.

My invention relates to clothes drying machines.

It is illustrated in the accompanying drawings, wherein—

Figure 1 is a front elevation with parts broken away; Fig. 2, a vertical section on line 2—2 of Fig. 1; Fig. 3, a horizontal section on line 3—3 of Fig. 2, and Fig. 4, a detail of a modification.

Like parts are indicated by the same letter in all the figures.

A is the drying chamber which may be provided with clothes racks like B adapted to roll on the bars C, C which extend into the upper part of the drying chamber.

The air is introduced into the drying chamber at the top preferably by means of apertures D, D about the top and under the long downwardly depending hoods E. The air may be introduced at the top in various other ways as, for example, by means of the pipe F which opens into the outer air below and into the inner upper portion of the chamber above. The air passes downwardly through the clothes to be dried and the relatively cool and vapor charged air is taken out at the bottom. This removal of the air may be conveniently effected in various ways but I have shown two drums G, G in the lower part of the drying chamber perforated at H, H along their bottom portions. From one of these perforated drums leads the pipe J and from the other leads the pipe K which opens into the pipe J. These pipes where they run substantially horizontally are also preferably provided with the holes H¹ H¹ on their lower sides. The pipe J discharges into the open air above and is controlled by the damper L and is provided also with a lateral portion M which opens into a drum N about the smoke pipe O, which is perforated at O¹ so that the air passing through the pipe M into the drum N is received into the smoke pipe. By this structure the heavy moisture laden somewhat cooled air is taken out of the bottom of the drier and discharged.

The heating of the air in the drying chamber is effected by the heater P which in this case is shown as a coal stove. The top P¹ is open, the bottom P² uncovered, but the heating body of the stove is inclosed in the drum P³ which is connected with the bottom of the drying chamber by the two lower inleading pipes P⁴ P⁴ and the upper out leading pipe P⁵. Thus the air is heated and caused to circulate in the drying chamber. The inleading pipes P⁴ should be connected with the drying chamber above the drums G or at a considerable distance from them. The pipe P⁵ is provided with a spreader or deflector P⁶ to distribute the hot air as it comes from the stove.

Q is a perforated diaphragm in the bottom of the drying chamber to prevent the clothes from falling on the pipes and drums below. In the form of structure shown in Figs. 1, 2 and 3 the stove lies wholly outside of the drying chamber, being simply connected therewith by pipes. A somewhat similar result may be obtained by the structure shown in Fig. 4 where the stove is inclosed in a chamber R which opens into the drying chamber, the two being preferably separated by a screen S. In this case the stove is inclosed in the chamber R except its top portion and the ash pan is connected by the mouth T with the open air. In the stove as shown, the fuel is inserted through the top U.

I wish my drawings to be taken as diagrammatic and intended, by presenting a complete structure with some modifications, to reveal my invention in one practical form. It will be evident, however, that the invention can be realized in somewhat varying structures. For example, the air can be introduced at the top in various ways. The moisture charged and relatively cool air can be removed from the bottom of the drying chamber in various ways, and the heating chamber can be connected with the drying chamber in various ways.

The use and operation of my invention will be clear. Pure air is introduced into the top of the drying chamber in any desired manner. It is caused to descend through the drying chamber, being heated during its descent. The wet and moisture charged and relatively cool air is taken from the bottom of the drying chamber and discharged. The heating is effected by means of a stove or heating device incased in a chamber which is connected with the drying chamber so as to secure circulation, and such stove is utilized to induce the current of air to flow upwardly from the bottom of the drying chamber. A heating chamber so placed is not effective except in connnection with means for compelling the air to move downward through the drying chamber.

I claim:

1. The combination of a drying chamber with means for introducing fresh air into the top thereof, means for withdrawing the relatively cool and vapor charged air from the bottom thereof comprising pipes leading from the bottom of such drying chamber and perforated on their lower sides, and means for heating said pipes to induce a current of air therethrough and for heating the air in the drying chamber comprising a heating device having a separate discharge for the products of combustion from its combustion chamber, a surrounding heating chamber, and connections from said heating chamber to the lower part of said drying chamber to heat the air therein and the perforated pipe.

2. The combination of a drying chamber with means for introducing fresh air into the top thereof, means for withdrawing the relatively cool and vapor charged air from the bottom thereof, comprising pipes leading from the bottom of such chamber and perforated on their lower sides, a pipe associated therewith to induce a current of air therethrough and heating drums surrounding a portion of said pipe, and means for heating the air in the drying chamber comprising a heating device having a separate discharge for the products of combustion from its combustion chamber which heats said drum, and a surrounding heating chamber, and connections from said heating chamber to the lower part of said drying chamber.

3. The combination of a drying chamber with means for introducing fresh air into the top thereof, means for withdrawing the relatively cool and vapor charged air from the bottom thereof comprising pipes leading from the bottom of such drying chamber and perforated on their lower sides, means for heating said pipes to induce a current of air therethrough and for heating the air in the drying chamber comprising a heating device having a separate discharge for the products of combustion from its combustion chamber, a surrounding heating chamber, and connections from said heating chamber to the lower part of said drying chamber to heat the air therein and the perforated pipe, said connections comprising a pipe from the lower part of the drying chamber to the lower part of the heating chamber and another from the upper part of said heating chamber to the drying chamber.

4. The combination of a drying chamber with means for introducing fresh air into the top thereof, means for withdrawing the relatively cool and vapor charged air from the bottom thereof, comprising pipes leading from the bottom of such chamber and perforated on their lower sides, a pipe associated therewith to induce a current of air therethrough heating drums surrounding a portion of said pipe, means for heating the air in the drying chamber comprising a heating device having a separate discharge for the products of combustion from its combustion chamber which heats said drum, a surrounding heating chamber, and connections from said heating chamber to the lower part of said drying chamber, said connections comprising a pipe from the lower part of the drying chamber to the lower part of the heating chamber and another from the upper part of said heating chamber to the drying chamber.

FRANCIS T. JOHNSON.

Witnesses:
ABBIE E. JOHNSON,
SOPHIE B. WERNER.